United States Patent [19]

Gaa et al.

[11] Patent Number: 4,592,956
[45] Date of Patent: Jun. 3, 1986

[54] TREATED GLASS FIBERS AND AQUEOUS DISPERSION AND NONWOVEN MAT OF THE GLASS FIBERS

[75] Inventors: Peter C. Gaa, Pittsburgh, Pa.; Jerry C. Hedden, Shelby, N.C.; Narasimhan Raghupathi, Murrysville, Pa.

[73] Assignee: PPG Industries, Inc., Pittsburgh, Pa.

[21] Appl. No.: 658,009

[22] Filed: Oct. 5, 1984

[51] Int. Cl.[4] .............................................. D02G 3/00
[52] U.S. Cl. ................................... 428/391; 65/3.41; 428/361; 428/392
[58] Field of Search ............... 428/375, 391, 392, 378, 428/446, 447, 361; 65/3.41, 3.43, 3.44

[56] References Cited

U.S. PATENT DOCUMENTS

| | | |
|---|---|---|
| 3,503,794 | 3/1970 | Donermeyer et al. . |
| 3,591,408 | 7/1971 | Marzocchi et al. . |
| 3,723,173 | 3/1973 | Schonfeldt . |
| 3,850,869 | 11/1974 | Mohr . |
| 3,870,547 | 3/1975 | Workman et al. . |
| 3,873,353 | 3/1975 | Wincklhofer et al. . |
| 4,039,716 | 8/1977 | Johnson . |
| 4,049,597 | 9/1977 | Motsinger . |
| 4,052,257 | 10/1977 | Hill et al. . |
| 4,248,935 | 2/1981 | Temple . |
| 4,265,704 | 5/1981 | Nahta . |
| 4,271,229 | 6/1981 | Temple . |
| 4,284,538 | 8/1981 | Graham ............................. 428/438 |
| 4,341,597 | 7/1982 | Andersson et al. . |
| 4,347,278 | 8/1982 | Flautt et al. . |
| 4,390,647 | 6/1983 | Girges ................................ 65/3.44 |
| 4,394,414 | 6/1983 | Brown et al. . |
| 4,435,474 | 3/1984 | Das et al. . |
| 4,457,785 | 7/1984 | Hsu et al. ....................... 106/308 N |

FOREIGN PATENT DOCUMENTS

| | | |
|---|---|---|
| 0104555 | 9/1983 | European Pat. Off. . |
| 1321847 | 2/1963 | France . |
| 1503926 | 3/1978 | United Kingdom . |

OTHER PUBLICATIONS

"Encyclopedia of Polymer Science and Technology", Plastics, Resins, Rubbers, Fibers, vol. 6, pp. 161–162.
Product Literature, "Nonionic Surfactant", BASF Wyandotte (Pluronic).
Staley Industrial Products, Technical Data, "Stadex ® Dextrins", Decatur, IL 62525.
U.S. patent application Ser. No. 422,771, (Hsu) filed 9/24/82, entitled "Treated Glass Fibers and Aqueous Dispersion and Nonwoven Mat of Glass Fibers".

Primary Examiner—Lorraine T. Kendell
Attorney, Agent, or Firm—Kenneth J. Stachel

[57] ABSTRACT

Treated glass fibers having adequate protection for gathering into strands and when chopped being more dispersible in aqueous media. The treated glass fibers having a coating of an aqueous treating composition, wherein the solids have a cationic surfactant having one or more primary, secondary and/or tertiary amine moieties and one or more water dispersible, poly(oxyethylene-oxyalkylene) copolymer having an oxide ratio of about 78 to about 22 to about 99 to about 1 and an average molecular weight of at least 15,000, and one or more polar functional coupling agents. Optionally, the solids may also have one or more starches that are insoluble or only incompletely soluble in cold water. Glass fibers treated with the aqueous treating compositions and produced into wet or dry chopped glass fiber strands having lengths of about 1/16 of an inch (1.58 mm) to about 3 inches (76.2 mm), have good dispersibility in aqueous media with or without addition of dispersing agents. Nonwoven, sheet-like mat is produced from aqueous dispersions having the chopped treated glass fibers, where some of the water is removed and polymeric binders, commonly referred to as wet strength binders, are applied and the mat is cured. The resulting nonwoven, sheet-like mat product has very good strength properties for use as a reinforcing element for roofing products, construction products and flooring products.

19 Claims, 2 Drawing Figures

TREATED GLASS FIBERS AND AQUEOUS DISPERSION AND NONWOVEN MAT OF THE GLASS FIBERS

The present invention is directed to treated glass fibers having good processibility into chopped glass fibers that are readily dispersible in aqueous solution, and can be produced into glass fiber-containing paper having good strength properties.

The production of glass fibers from molten glass involves attenuating fibers from small orifices in a bushing in a glass melting furnace. The glass fibers usually are attenuated by a mechanical means and are usually gathered into one or more strands and are either collected as continuous strands on a winder or are chopped and collected as wet chopped glass fiber strands. During the attenuation and before the numerous glass fibers are gathered into one or more strands, a treating composition, which is known as a sizing composition, is applied to each of the glass fibers. The aqueous sizing composition is necessary to provide protection to the glass fibers from interfilament abrasion, especially when the fibers are gathered together as strands. Also, the sizing composition can be used to promote compatibility between the glass fibers and any matrix in which the glass fibers are to be used for reinforcement purposes. The collected continuous strands, or chopped strands can be dried, or wet chopped strands can be packaged in their wet condition. The dried continuous glass fiber strands can be chopped or combined with other glass fiber strands to form rovings, or produced into continuous strand mats or woven. Such steps depend upon the ultimate use for the glass fibers.

Glass fibers have been used by themselves and in combination with other types of fibers in the production of paper-like sheet materials. Glass fibers have been used as such a supplemental fiber in specialty, synthetic, fiberboard, pulp and composite papers. Also, the glass fibers are finding a use in glass fiber paper which is a substitute for papers made of asbestos fiber. Also, in recent years, there has been increasing use, and industry desire for further use, of a nonwoven, sheet-like mat of chopped glass fibers and/or strands as a replacement for organic felts such as cellulose mats in roofing shingles and builtup roofing systems (BUR systems). This usage and further expanded usage of the glass fiber mats in the roofing industry is based on several advantages of using the glass fiber mat. These advantages include: the reduction in the amount of asphalt necessary for the roofing products, the reduction in the weight of the roofing products, increased production rates for producing the roofing products, superior rot resistance, longer product life, and improved fire ratings. These types of papers and nonwoven, sheet-like mat are usually produced in a process where chopped fibers, or chopped fiber strands are dispersed in an aqueous solution and formed into a mat of chopped glass fibers and/or strands. A nonwoven, sheet-like mat product is produced by contacting the mat of glass fibers with a polymeric binder. An example of a process to produce such a mat is the "wet-laid process".

The wet-laid process involves forming an aqueous dispersion of chopped fibers or chopped strands usually with agitation in a mixing tank. The aqueous dispersion, usually referred to as slush, is processed into the wet-laid, sheet-like mat by such machines as cylinder or fourdrinier machines or more technologically advanced machinery, such as the Stevens Former, Roto Former, Inver Former and the VertiFormer machines. The slush is deposited in a manner from a head box onto a moving wire screen or onto the surface of a moving wire-covered cylinder. The slurry on the screen or cylinder is processed into the nonwoven, sheet-like mat by the removal of water, usually by suction and/or vacuum device, and by the application of a polymeric binder with further removal of water and excess binder by suction and/or vacuum devices. The binder impregnated nonwoven, sheet-like glass fiber mat is dried and cured in one or more ovens.

The strength of the nonwoven, sheet-like mat of glass fibers must be sufficient to withstand the processing steps and speeds to produce the nonwoven, sheet-like mat for application in various end uses. In addition, the finish on the glass fibers and the strength of the sheet-like mat must be sufficient to permit the mat to be stored in any desirable form, possibly for an extended period of time without loss of its cohesive properties. Also, the finish on the glass fibers in the sheet-like mat should enable the stored mat to be processed into end use applications without cracking or without the production of large amounts of static being generated during use. The efficient processability of the nonwoven, sheet-like mat into various end applications depends on the strength properties of the sheet-like mat and also the structure and homogeneity or uniformity of the arrangement of the glass fibers in the mat itself.

Also, the strength of the sheet-like mat is important for the strength that the mat gives to any end product incorporating the mat. For example, when the sheet-like mat of chopped glass fibers and/or strands is to be utilized in producing roofing products, such as shingles and the mat for BUR systems, the sheet-like mat must have sufficient strength properties to enable the processing of the sheet-like mat into these products. The roofing industry is seeking higher strengths for these products, and this is especially true for dry tensile and tear strengths of the sheet-like mat.

The uniformity of the arrangement of chopped glass fibers and/or strands in the nonwoven, sheet-like mat of chopped glass fibers and/or strands contributes to the strength of the mat and to the ultimate end product. One problem that exists in preparing a uniform mat of chopped glass fibers and/or strands from an aqueous dispersion is that glass fibers are not easily dispersed in aqueous media. This difficulty in dispersing the glass fibers occurs initially upon adding the glass fibers to water. The dispersibility is further complicated by the tendency of the glass fibers, once they are present and evenly scattered to some degree in the aqueous medium, to reagglomerate to some degree. The reagglomerated glass fibers are very difficult to redisperse. The lack of a good dispersion of the glass fibers in the aqueous medium hampers the formation of a uniform mat, and adversely affects the strengths of any resultant sheet-like mat or end product incorporating the mat.

A recent product marketed by PPG Industries, Inc. under the trade designation 2029 fibers had excellent dispersibility and performed well in the then existing glass paper manufacturing process. Our research has continued in this field to develop even better glass fiber products. The glass paper-making industry strives for processes with faster line speeds which necessitate higher drying temperatures and for lower weights of the chopped glass fiber mats.

It is an object of the present invention to provide treated glass fibers that are adequately protected from interfilament abrasion, where the fibers are in the form of choppable bundles of fibers, and at the same time, provide treated glass fibers that have good dispersibility in aqueous media, and are useful in forming aqueous dispersions of chopped glass fibers and/or strands that can be produced into non-woven sheet-like mat having good strength properties.

It is a further object of the present invention to have nonwoven, sheet-like mats having one or more polymeric binders having good strength properties, such as good wet-strength properties, dry-strength properties, and/or tear-strength properties to allow for good processability of the mats themselves, and of the mats into resulting products, such as base materials for roofing products like BUR systems and shingles and flooring.

SUMMARY OF THE INVENTION

Accordingly, the foregoing objects and other objects gleaned from the following disclosure are accomplished by the present invention.

The treated glass fibers of the present invention have been treated with an aqueous treating composition applied to the glass fibers in any manner and comprising one or more water soluble, dispersible and/or emulsifiable cationic lubricants having one or more primary, secondary and/or tertiary amines and one or more water soluble, poly(oxyethylene-oxalkylene) copolymers having a molecular weight of at least 15,000 and a weight ratio of ethylene oxide to hydrophobic alkylene oxide in the range of from around 99 to around 1 to that of around 78 to around 22, and one or more coupling agents having an organic and an inorganic polar functional moiety and water in sufficient amounts to give a total solids for the treating composition of about 0.1 to about 25 weight percent.

The treated glass fibers have an amount of the treating composition in the range of about 0.01 to about 5 weight percent on a loss on ignition (LOI) basis, where the treated fibers are in the form of bundles and/or strands. The treated glass fibers can be in any form such as continuous glass fiber strands or chopped glass fiber strands, which are produced as wet chopped or dry chopped glass fiber strands. When the chopped treated glass fiber strands are dispersed in aqueous media, the use of a dispersion system of one or more dispersing agents is not needed; however, if desired, these agents can be used because the treated glass fibers do not interfere with the function of the dispersing agents.

Optionally, the treated glass fibers may have in the treating composition one or more starches in an amount of up to about 35 weight percent of the solids of the treating composition. Also the amount of the lubricating surfactant is optionally present in an amount in relation to the copolymer in a range of weight ratios of copolymer to lubricating surfactant of from about 85 to about 15 to that of about 95 to about 5.

A second aspect of the present invention is an aqueous dispersion of chopped treated glass fibers and/or strands. A third aspect is a nonwoven, sheet-like glass fiber-containing mat produced from such a dispersion by the removal of some water from the aqueous dispersion that is present on a wire screen or cylinder. The glass fiber-containing mat is contacted with the one or more polymeric binders to produce the nonwoven, sheet-like mat having good strength properties such as wet and dry tensile strength and tear strength to be useful as a base or supporting layer in roofing products and flooring products and other products, where a good strength mat is required along with a Class A fire rating and good rot resistance.

DETAILED DESCRIPTION OF THE INVENTION

Figure 1:
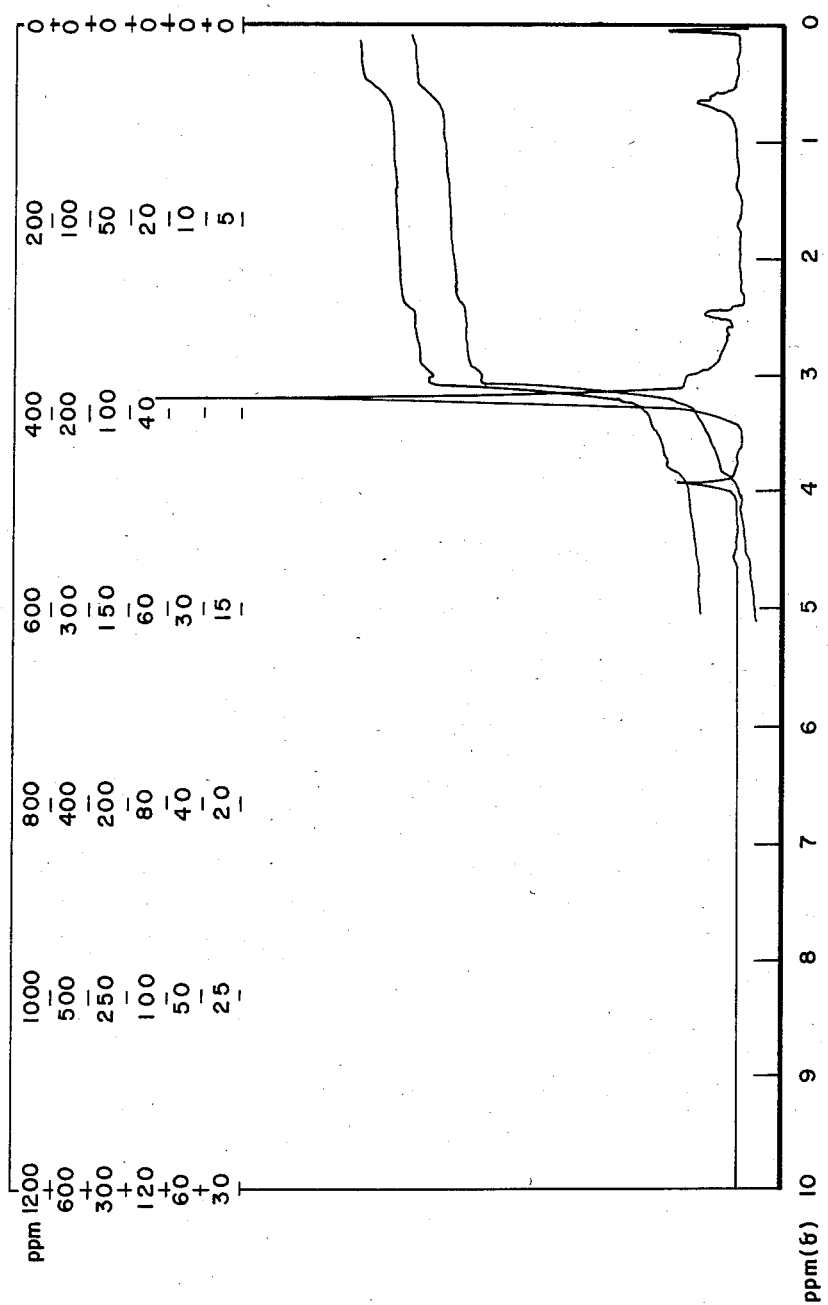
FIG. 1 is an NMR spectrometric curve of an example of a commercially available poly(oxyalkylene-oxyethylene) copolymer useful with the glass fibers.

The treating composition of the present invention provides good protective properties for the glass fibers, when they are gathered into strands for continuous glass fiber strands, or when they are in the form of chopped glass fibers and/or strands. Hereinafter, in the specification and claims, both fibers and strands will be referred to collectively as fibers. When the chopped treated glass fibers of the present invention are dispersed in any type of aqueous media, good dispersibility is obtained in the aqueous media even in the absence of a dispersing agent. In making and using a nonwoven, sheet-like mat of the glass fibers, good strength properties are required for the processability of the mat into end use products such as shingles and other roofing products or flooring products. Certain properties for these ultimate products are necessary. These properties include one or more of the following: good tear strength and good flexibility and good wet, dry and hot-wet tensile strengths.

It has been discovered that a majority, if not all, of these properties can be achieved with the use of the treated glass fibers, aqueous dispersion and glass fiber-containing, nonwoven, sheet-like mat of the present invention. The achievement of obtaining good properties in these areas is effected by the synergistic influence of the chemical components making up the treating composition on the glass fibers, the interrelationship between the chemical treating composition and the surface of the glass fibers, and the interrelationship between the treatment on the glass fiber surface and the polymeric binder used to make the nonwoven sheet-like mat having the polymer binder.

The treating composition of the present invention has present one or more copolymers of ethylene oxide and a hydrophobic and/or lipophilic alkylene oxide. The copolymer can be a random or heteric, graft, or block copolymer having a weight average molecular weight greater than around 15,000. The oxide ratio of the mixture means the proportion by weight of ethylene oxide to the hydrophobic alkylene oxide, where the proportion of ethylene oxide is given first. The oxide ratio is in the range of about 78 to about 22 to that of about 99 to one. The copolymer must have some hydrophobic alkylene oxide to prevent a decrease in tear strength of the glass paper product, but the amount of hydrophobic alkylene oxide should not be too high to affect deleteriously the aqueous dispersibility of the glass fibers. The copolymer can be block copolymers prepared with the desired oxide ratios by any method known to those skilled in the art. For instance, a condensation of propylene oxide with propylene glycol or water can be conducted in the presence of a basic catalyst to form poly(oxypropylene) homopolymer which is then reacted with ethylene oxide to give the block copolymer having a formula of an "aba" or $(a)_z(b)_z$ type block copolymer like: HO—(CH$_2$—CH$_2$—O)$_a$ (hydrophobic/lipophilic alkylene oxide )$_b$ (CH$_2$CH$_2$O)$_c$H. The letters a, b, and c are integers where "b" is from about 1 to about 22 and "a" and "c" are from about 99 to about 78. The letters indicate the total content of the materials rather than their distribution or their numbers within each block. Any number of blocks of each oxide can be present from one each to as many that result in one oxide per block as indicated by the letter "z". Also the block copolymer can be tetrahydroxy block copolymers initiated with ethylene diamine. These types of block copolymers can be prepared by any method known to those skilled in the art such as by reaction of propylene oxide with ethylene diamine to give N,N,N'N'-tetrakis (2-hydroxypropyl)- ethylene diamine that is further reacted with propylene oxide and ethylene oxide. These materials have general formulas such as:

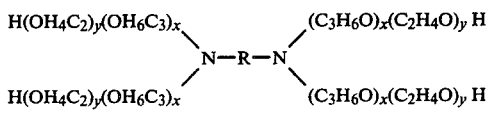

wherein R is a difunctional radical from a hydrocarbon containing 1 to 13 carbon atoms, preferably a lower alkyl aliphatic hydrocarbon containing 1 to 6 carbon atoms and most preferably two carbon atoms, and x and y are each average numbers to comply with the desired oxide ratio to the nearest 10% and are only indicative of the total content of ethylene oxide units and hydrophobic/lipophilic alkylene oxide units and are not an indication about their block distribution in the homologues of this molecule, and where either the ethylene in this molecule or oxide or hydrophobic/lipophilic alkylene oxide can be bonded to the hydrocarbon radical, and wherein these materials can be slightly cationic in character.

The random copolymers can also be produced by any method known to those skilled in the art as long as the desired oxide ratio is achieved. For example, mixtures of propylene oxide and ethylene oxide can be reacted with propylene glycol or glycerol and other aliphatic diols using an alkali metal hydroxide catalyst. Nonexclusive examples of the alkylene oxide which is hydrophobic and lipophilic include: propylene oxide (1,2-epoxy), propane, butylene oxide, styrene oxide and cyclohexane oxide. The polyethylene oxide-containing polyalkylene oxide block copolymers can be obtained by reacting the hydrophobic/lipophilic oxide with difunctional ethylene-oxygen compounds containing an active hydrogen such as glycols to form a series of polyoxyalkylene hydrophiles. With the large proportion of ethylene oxide these copolymers are always water soluble even at high molecular weights. The preferred number average molecular weight of the copolymers is from about 24,000 to about 30,000. The preferred oxide ratio of the copolymer is from about 80/20 to about 90/10 and the preferred hydrophobic alkylene oxide is propylene oxide.

It is believed without limiting the invention, that the copolymer provides protection for the glass fibers from interfilament abrasion and that the polymer provides some lubricity without giving the treated fibers too much adhesion or cohesion to retard the aqueous dispersibility of the chopped treated glass fibers.

A particularly suitable poly(oxyethylene-oxyalkylene)copolymer is the tetrol compound available commercially under the trade designation Tetronic ® 1508 tetrafunctional block copolymer which is in flake or cast solid form. This material is derived from the addition of ethylene oxide and propylene oxide to ethylenediamine and it is 100% active. The material has a number average molecular weight of 30,000 and a Brookfield viscosity in centipoise (cps) at 77° C. of 39,000, and a specific gravity at 77° C. of 1.05, and a cloud point (1% aqueous solution) of 100° C., and a surface tension in dynes/cm at 0.1% and 25° C. of 43.8, and a melting point of 60° C. and a hydrophilic/lipophilic balance (HLB) value of 27° at 25° C. A nuclear magnetic resonance (NMR) spectrometric curve of this material is given in FIG. 1. The NMR was performed on a Varian EM-360 60 MHz proton NMR Spectrometer with a sweep time of 5 minutes and sweep width of 10 ppm and an end of sweep of 0 ppm and zero reference of tetramethylsilane (TMS) and an ambient sample temperature and with DCC$_3$ solvent. The NMR indicates that the copolymer with about 19,000 weight average molecular weight has an oxide ratio of about 84 ethylene oxide to about 16 propylene oxide. Another usable block copolymer that can be used is the Tetronic 909 material.

The amount of the copolymer used in the aqueous treating composition is in the range of about 0.1 to about 15 weight percent of the aqueous treating composition. The most useful amount in the aqueous treating composition of the present invention is a predominant amount of the solids of the composition. This is on the order of about 50 to about 99 weight percent and preferably about 60 to about 85 weight percent of the solids (non-aqueous components) of the treating composition.

The treating composition of the present invention also has one or more organo-metallic or organo-silane coupling agents having polar organic functionalities through the presence of hetero-atoms like nitrogen, oxygen, chlorine and/or sulfur and the like. The organo-metallic coupling agents include complex compounds of the Werner type in which a trivalent nuclear atom, such as chromium, is coordinated with an organic acid such as methacrylic acid, and basic (hydroxy containing) metal salts of strong mineral acids as basic chromium chloride, basic chromium sulfate, etc. The organo-silane coupling agent can be in its unhydrolyzed or hydrolyzed form, silanol form or in the siloxane polymeric form. Examples of the polar organic functionalities for the coupling agents that can be used are amino, acrylic, epoxy, thio, ureido, and chloroalkyl organic groups like the amino silanes, epoxy silanes and thio silanes, ureido functional silanes, and chloropropylsilanes and lubricant modified variations of these silane coupling agents. It is suspected without limiting the invention, that the organic polar functionalities present with the coupling agents lead to chemical interactions with the polymeric binders used to impregnate the nonwoven, sheet-like mat where the polymeric binder also has polar functionality.

Nonexclusive examples of silane coupling agents found particularly suitable for use in the treating composition of the present invention include amino functional silanes like those having the formula NH$_2$—R$_2$—Si—(OR$_1$)$_z$, where $z$ is an integer from 1 to 3 or the corresponding hydrolysis products such as corresponding silanols and/or polysiloxanes and R$_1$ can be the same or different moieties selected from lower alkyl or aliphatic hydrocarbons having less than eight and preferably less than 5 carbon atoms, and where $R_2$ is a difunctional radical selected from the lower alkyl or aliphatic hydrocarbons having less than eight carbon atoms. Nonexclusive examples include gamma aminopropyltriethoxy silanes such as those commercially available from Union Carbide Corporation under the trade designation A-1100 silane coupling agent, and A-1108 amino silane coupling agent that is modified with a lubricant, and A-1111 silane coupling agent, which is N-bis(-betahydroxyethyl) gamma-aminopropyltriethoxy silane, and N-beta(aminoethyl) gamma aminopropyltrimethoxysilane (A-1120) and ureido-modified amino silane (A-1160) and vinylbenzylamine functional silane (Z-6032) where the A designated materials are available from Union Carbide Corporation and the Z-designated materials are available from Dow Corning Corporation. Also, epoxy silanes such as gamma-glycidoxy propyltrimethoxy silane (A-187) available from Union Carbide Corporation has been found particularly suitable for the present invention. Nonexclusive examples of epoxy silanes that can be used are the epoxy silanes having the general formula:

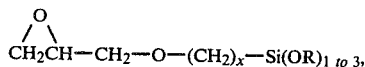

wherein $x$ is an integer from 1 to 6 and R is a lower alkyl, for example, methyl, ethyl, propyl, isopropyl, etc., or epoxy silanes of the formula

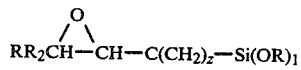

to 3, where $z$ is an integer from 1 to 6 and R and $R_2$ are the same or different aromatic or lower alkyl compounds and these epoxy silane compounds include the corresponding hydrolysis products such as the corresponding silanols and/or polysiloxanes. Representative examples of the epoxy silanes include gamma glycidoxy alkyl trimethoxy silane; gamma-glycidoxy alkyl triethoxy silane; delta-glycidoxy butyl trimethoxy silanes; and 3,4-epoxy cyclohexylethyltrimethoxy silane; beta-glycidoxyethyltriethoxy silane; beta-(3,4-epoxycyclohexyl) ethyltri(methoxyethoxy)silane; beta (3-epoxyethyl phenyl) ethyltrimethoxy silane; beta(epoxyethyl) ethyl triethoxysilane; 4,5-epoxy-n-hexyl trimethoxy silane; 15,16-epoxy-n-hexadecyltrimethoxysilane; 3-methylene-7-methyl-6-7-epoxyoctyltrimethoxy silane. Also, the acrylic functional silane coupling agents such as gamma methacryloxy alkyl trimethoxy silane can be used. The amount of coupling agent such as organo silane used in the treating composition of the present invention is in the range of about 0.01 to about 2 and preferably less than 1 weight percent of the total treating composition. The addition of nonpolar type coupling agents do not achieve any additional benefit in the performance of the treating composition and the performance of the treated glass fibers when used for the preparation of a nonwoven, sheet-like mat.

The treating composition of the present invention has one or more water soluble, dispersible or emulsifiable cationic lubricant surfactants having one or more primary, secondary and/or tertiary amine moieties. Nonexclusive examples of the cationic lubricating surfactants include: aliphatic mono, di, and polyamines like N-alkyl trimethylenediamine, 2-alkyl-2-imidazoline or 1-(2-aminoethyl)-2-alkyl-2-imidazoline, where respectively, the alkyl groups can be those such as soya alkyl, tallow alkyl, coco alkyl or 9-octa-decyl or mixtures of alkyls, heptadecenyl, undecyl or heptadecyl, nonyl or mixtures of alkyls, where these compounds are water soluble, dispersible or emulsifiable. Also compounds can be used that are like: amine oxides, polyoxyalkylene alkylamines, 1-(2-hydroxyalkyl)-2-alkyl-2-imidazolines, 2-hydroxyalkyl-2-imidazoline, or N,N,N',-tetrakis-substituted alkylene diamine derivatives or rosin derived amines, where the alkyl groups can be like cetyl, lauryl, myristyl, stearyl, coco, hydrogenated tallow, hexadecyl, tallow octadecyl, alkyl groups for polyoxyalkylene, aliphatic and resin monoamines, where the alkylene is ethylene or an equivalent, soybean, alkyl groups with from about 8 to about 22 carbon atoms and soya. Other useful cationic surfactants include polyoxyethylene alkyl and alicyclic amines, where any of the aforelisted alkyl groups and any of the known alicyclic groups can be used. These cationic materials are more fully described in the "Encyclopedia of Chemical Technology", Kirk and Othmer, Vol. 19, pages 554–563, The Interscience Encyclopedia, Inc., N.Y. These cationic materials include those like polyoxyethylene linear alkyl amines, and polyoxyethylene dihydroabietyl amines. Also useful are the condensation reaction products of carboxylic acids, fatty acids with di or polyamines or dialkylene or polyalkylene amines and polyalkoxylated derivatives thereof.

A particularly useful class of cationic surfactants are the lubricant cationic surfactants that are alkyl imidazoline derivatives, which includes compounds of the class, n-alkyl-N-amido-alkyl imidazolines, which may be formed by causing fatty acids or carboxylic acids to react with polyalkylene polyamines under conditions which produce ring closure. The reaction of tetraethylene pentamine with stearic acid is exemplary of such a reaction. These imidazolines are described more fully in U.S. Pat. No. 2,200,815 and other imidazolines are described in U.S. Pat. Nos. 2,267,965; 2,268,273; and 2,353,837. The most useful cationic lubricating surfactant is that available under the brandname Cation-X softener from Lyndal Chemical Co., Lyndhurst, N.J.

The amount of the cationic surfactant in the treating composition is in the range of about 0.01 to about 10 weight percent of the aqueous treating composition. The amount of the cationic surfactant will vary in this range depending on the number and type of cationic groups present in the cationic surfactant. Preferably because of the lubricating properties of the copolymer, the amount of cationic lubricating surfactant is usually not more than 15 weight percent on a solids basis of the copolymer. Most preferably, the cationic lubricating surfactant is not more than around 13 weight percent on a solids basis of the copolymer.

In addition to the foregoing components, the treating composition preferably, but not necessarily, has one or more starches that are less than completely soluble in cold water in an amount of up to about 35 weight percent of the solids of the aqueous chemical treating composition. This amount of starch aids in making the treated glass fiber strand more choppable. Amounts greater than around 35 weight percent may make the strands even more choppable, but these amounts would unacceptably reduce the aqueous dispersibility of the glass fibers and would adversely affect physical properties of resultant glass paper products. The starches are preferably present in an amount of around 15 to about 25 weight percent of the solids of the aqueous treating composition. By the phrase "starches that are less than completely soluble in cold water", it is meant to exclude the fully dextrinized starches with a canary color that are completely soluble in cold water. It has been found that the cold water soluble dextrinized starches do not offer a sufficient benefit for their concomitant disadvantages. The less than completely soluble in cold water starches are generally soluble in a range of about 10 to about 90 percent and have been only partially converted to dextrins from the starches from which they are derived. For example, the partial conversion of an unmodified corn starch can involve derivatization by heating with an acid catalyst to partially hydrolyze and in some instances partially repolymerize the starch. Nonexclusive examples of suitable starches include: amylose-containing starches and starch mixtures derived from any starch sources including corn, wheat, potato, tapioca, waxy maize, sago, rice, hybrid starches, etc. Conventionally, however, the starch components having a high amylose content, e.g., 50 to 60 percent by weight, are derived from either corn starch or a hybrid corn starch. The starch components having a low amylose content, e.g., 20 to 30 percent by weight are usually derived from either potato or derivatized corn starch, such as cationic, phosphatized, ethoxylated or esterified derivatives. The overall amylose content of a starch mixture can vary from about 35 to about 55 percent by weight based on the total starch content. Examples of particularly suitable starches are those of U.S. Pat. Nos. 3,227,192; 3,265,516; and 3,887,389 all commonly assigned to the assignee of the present application and all hereby incorporated by reference.

Examples of commercial starches that can be used as the high amylose starch component and the low amylose starch component include for the high amylose starch component the starch designated "Hylon", available from National Starch, and the starch designated "Miraquik", available from A. E. Staley Manufacturing Company and Amaizo 213 starch available from American Maize Products Company. An example of the commercially available low amylose starch component is "Amaizo 310", available from American Maize Products Company and "National HFS", "National 1554", all available from National Starch, and Ethylex 2065 available from A. E. Staley Manufacturing Co. Particularly suitable commercial starches are the Nabond starches and the Amaizo 213 starch. It is preferred to use a starch mixture that is a mixture of a high amylose-containing starch and a low amylose-containing starch as in the aforeincorporated U.S. patents.

Before the starch is employed in the aqueous sizing composition of the present invention it is cooked to facilitate its suspension into the size. The cooking is accomplished in a jet cooker such as that supplied by National Starch and Chemical Company and the temperature of the cooking is in the range of around 235° F. (113° C.) to around 255° F. (224° C.). The type of starch that is cooked allows for only partial but easy cooking.

In addition to the foregoing chemical compounds, the treating composition of the present invention may have any of the chemical compounds, which are known to be useful in aqueous treating compositions for treating glass fibers to be dispersed in aqueous media. Nonexclusive examples include additional film forming polymers, lubricants, antioxidants, bactericides and the like. Preferably, nonpolymeric amide compounds that are water soluble or dispersible such as urea or monoamides, diamides, amine-containing amides, carbamide and derivatives, where the amide and amine groups are primary or secondary or mixtures thereof are not used in the present invention. The addition of such a compound to the composition does not serve any additional function or contribute any additional benefit for the composition.

Also present in the treating composition of the present invention is a liquid carrier, which is preferably water to make the treating composition an aqueous treating composition. The amount of water present in the aqueous treating composition is that amount necessary to give the treating composition a total solids content within a level, whereby the viscosity of the aqueous treating composition is effective for application to glass filaments, that is, a composition with a viscosity of around 0.6 to about 50 centipoise at 60° C. or less. Particularly, the amount of water present in the aqueous treating composition is sufficient to give a total solids (nonaqueous) content of the aqueous treating composition in the range of about 1 to about 25 percent by weight and preferably about 2 to about 10 percent by weight of the aqueous treating composition.

The treating composition of the present invention can be prepared by any method and with any equipment known to those skilled in the art for preparing aqueous treating compositions to be applied to glass fibers. For instance, the chemical compounds can be added sequentially or simultaneously to water or in any order whatsoever. When the chemical compounds are only slightly water soluble, it is better to dissolve these materials in warm water before diluting with cold water to prepare the aqueous treating composition in its final volume. This is especially true for the starches which must be precooked as aforedescribed.

The aqueous treating composition can be applied to any type of glass fiber by any method known to those skilled in the art. For instance, the glass fibers can be prepared by mechanical attenuation or the like from batch compositions known as "E" glass or "621" glass or any more environmentally acceptable derivatives thereof, and other types of glasses such as "A" glass, "C" glass, or "S" glass via direct or indirect melting operations. The aqueous treating composition can be applied to the glass fibers after they are formed and during their attenuation by any type of applicator such as belt applicators, roll applicators or any applicator which enables the liquid to contact the glass fibers. The amount of the aqueous treating composition applied to the glass fibers should be sufficient to give at least a partial or intermittant coating of the treating composition on the treated glass fiber strand or around 0.01 to about 5 weight percent of the treated glass fiber strand. The treated glass fibers can be chopped directly as fibers or gathered into one or more glass fiber strands and chopped, where the fibers or strands are chopped during the process of forming the glass fibers after the treating composition has been applied to them. The chopped lengths vary from about 1/16 (1.59 mm) of an inch to about 3 inches (76.2 mm) and more particularly about ½ inch (12.7 mm) to about 1 inches (25.4 mm). Such a process is commonly referred to in the art as the wet chop process. The amount of the moisture on the wet-chopped glass fiber is usually in the range of up to about 20 weight percent of the treated fibers and preferably up to about 15 weight percent and most preferably between about 9 and about 15 weight percent. Also the glass fibers can be treated and gathered into strands much like the wet chop process, but the fibers are collected as continuous glass fiber strands into a forming package and subsequently chopped in a remote wet chop process or after drying in a dry chop process into lengths similar to those of the direct wet chop process. In preparing the glass fiber strand, the filament diameter of the glass fibers making up the strands can vary from around 3 microns to around 20 microns or higher and preferably around 9 to around 18 microns.

The aqueous dispersion of treated glass fibers is achieved merely by placing the wet or dry chopped glass fibers of the desired length into a batch of water with or without dispersing aids usually with agitation and/or turbulence to form a dispersion of glass fibers for use in the wet-laid process or other paper making processes. The amount of the chopped treated glass fibers in the aqueous dispersion can range from about 0.001 to about 5 but preferably about 0.01 to about 3 weight percent of the aqueous dispersion. Although the treated glass fibers of the present invention can be used without dispersion aids, any of the conventional dispersion aids can be used with the chopped, treated glass fibers of the present invention. Nonexclusive examples of such dispersion aids that can be used include the polyoxyethylated tallow amine dispersing agent available from GAF Corporation under the trade designation "Katapol" agents like VP532 used alone or in conjunction with thickeners like hydroxy and/or carboxy alkyl cellulose, especially the hydroxy ethyl and hydroxyl methyl celluloses and soluble or dispersible salts thereof such as that available from Hercules, Inc. under the trade designation "Natrasol" or other thickeners like "Separan AP273" polyamide from Dow Chemical Company and the like. Another example of a dispersing agent that can be used with the chopped glass fiber strands of the present invention is the dispersing agent available from Diamond-Shamrock Chemical Company under the trade designation "Nopcosperse" and especially the "Nopcosperse" FFD product. The Nopcosperse FFD product is a blend of alkyl sulfate quaternary of the alkyl amino fatty acid amide or amine in a water dispersible, mineral oil with an inorganic silica defoaming agent. Other examples of dispersing agents that can be used include the quaternary ammonium compounds such as those available under the trade designation "Arquad 2 HT-75" and the like. Also, quaternary ammonium surfactants can be used such as those available under Arquad and Aliquat trade designations and mixtures of amine oxides with derivatized guar gum and mixture of guar gum and isostearic amides can be used.

The nonwoven, sheet-like mat of treated chopped glass fibers can be made by any method and with any apparatus known to those skilled in the art. For example, a hand mold method and apparatus can be used or the Fourdrinier paper machine or cylinder machines can also be used. Also, the machines known as Stevens former of the Beloit Corporation and the Rotoformer from the Sandy Hill Corporation and the Inver former from the Beloit Corporation and the Vertiformer from the Black Clawson Company can all be used to form the mat of the present invention. In the wet-laid process, the aqueous dispersion of glass fibers may be diluted by white water and held in a head box of any of the aforementioned machines. The white water is water containing similar dispersing agents as the aqueous dispersion, where the white water is fresh and/or recirculated from collection points in the process of forming the nonwoven mat. The aqueous dispersion from the head box is placed on a screen or cylinder, where some water is removed usually by vacuum or suction apparatus. After sufficient water has been removed, the mat has a polymeric binder applied to it, and any excess binder is removed usually by vacuum or suction means. The binder-containing mat is dried and cured in one or more ovens to produce the nonwoven, sheet-like mat. The mat may be collected usually in a large roll weighing from several hundred pounds to close to 1,000 pounds.

The polymeric binders that are used to produce the sheet-like mat are any of the group of so-called "wet strength" resins, which include such resins as urea formaldehyde and cationic polyamideepichlorohydrin commercially available from Hercules, Inc. under the trade name "Kymene 557 H" and cationic urea-formaldehyde resins available from Hercules, Inc. under the trade designations "Kymene 882" and "Kymene 917". Also, melamine-formaldehyde type resins and phenol formaldehyde type resins and resorincol formaldehyde type resins and polymerizable polyfunctional N-methylol compounds, notably N-methylol ureas such as dimethylol urea and N-methylol melamine type resins and other amino resins known to those skilled in the art can be used. Other types of resins that can be used are polyvinyl alcohol, polyvinyl acetate, and acrylic polymers and copolymers. Also, mixtures of resins can be used such as the urea formaldehyde or melamine formaldehyde resins mixed with styrene butadiene copolymer latices and other latices and/or acrylic polymers or copolymers like acrylamide. The amount of binder used in the non-woven, sheet-like mat product is in the range of about 3 to about 45 percent, preferably about 10 to about 30 percent based on the weight of the unfinished mat. If the amount of binder is too great, the porosity of the mat could be adversely affected, and, if the amount is too low, the integrity of the mat could be adversely affected. After the binder is applied, the binder-containing glass fiber mat is dried to set or cure the binder. This can be accomplished with can driers or any one or more drying devices used in the art.

The nonwoven, sheet-like glass fiber mat of the present invention is suitable for use as a replacement for felt in shingles and also for use in built-up roofing (BUR) systems and for use as backing materials and base materials in flooring applications. In these applications, the mat with the polymeric binder must have certain strength properties. These strength properties are measured by dry tensile, wet tensile, hot-wet tensile and tear strength of the mat with the polymeric binder. A good mat and binder product must have adequate tensile strength and adequate tear strength and wet strength. The nonwoven, sheet-like mat and binder product of the present invention has these adequate properties and even further improved values for some of these properties as is shown in the examples of the present invention.

PREFERRED EMBODIMENT OF THE INVENTION

Glass fibers that are treated with the aqueous treating composition of the present invention are preferably those having filament diameters of around 9 to around 18 and most preferably, 16 microns. The aqueous treating composition preferably has one cationic lubricant surfactant which is the fatty imidazoline derivative formed as the reaction product of tetraethylene pentamine and stearic acid, which also may have enough dextrin to prevent syneresis. Also, the composition has the tetrafunctional type poly(oxyethylene-oxypropylene) polymer with an oxide ratio of around 80/20 to around 90/10 and a molecular weight of around 24,000 to around 30,000. Also the treating composition has a polar functional silane coupling agent, starch mixture, and water.

The copolymer present in the treating composition is from BASF Wyandotte Corporation under the trade designation Tetronic 1508, which may have antioxidants incorporated into the flaked product. It is also most preferred that the cationic lubricant is that available under the trade designation Cation-X - version C from Lyndal Chemical Co., Lyndhurst, N.J. It is further most preferred that the aqueous treating composition have the polar epoxy functional silane coupling agent, and an aqueous cooked starch mixture of 85:15 National 1554 starch to Amaizo 213 starch. The aqueous cooking is conducted in a jet cooker at around 255° F. (124° C.) for a sufficient time to where the 1554 starch is around 40 percent soluble in water. The preferred amounts in weight percents of the aqueous treating composition of these materials are: for the copolymer, an amount of about 0.1 to about 2, and the amount of the epoxy silane coupling agent, which is gamma-glycidoxypropyltrimethoxy silane, of about 0.03 to about 0.4 and for the starch, an amount in the range of about 0.01 to about 2. The amount of water present in the aqueous treating composition is that sufficient to give a solids content in the range of about 0.1 to about 7.5 weight percent, and most preferably about 0.5 to about 1.5 weight percent.

The aqueous treating formulation is prepared by completely hydrolyzing the epoxy silane in a premix vessel in neutral water with a pH of about 6 to about 8. In a premix vessel, the cationic lubricant surfactant is dissolved in warm water and not at a temperature above 145° F. (62° C.) to avoid degradation before diluting with cold water in a premix vessel. The poly(oxyethylene-oxypropylene) is dissolved completely in warm water of about 180°±20° F. (82° C.±5° C.) before diluting with cold water in a premix vessel. The starch mixture is precooked in a jet cooker and added warm to other materials. The materials in the premix vessels can be combined in any fashion, though it is preferred to add the diluted cationic lubricant surfactant to the epoxy silane solution and add the dissolved polyol to this mixture and then dilute with water to the final desired volume. If foam buildup occurs, any defoaming agent can be added, but preferably the defoaming agent available from Diamond-Shamrock Company under the trade designation NDW is added.

The aqueous treating composition is used to treat the glass fibers preferably in a wet chop process, where the treated glass fibers are gathered into strands and chopped during the fiber formation and attenuation process. Preferably, the treated glass fibers are chopped into lengths ranging from ½ inch (12.7 mm) to a little over 1 inch (25.4 mm). The treated glass fiber strands have an amount of the treating composition ranging in an amount from about 0.01 to about 1.5 percent, most preferably 0.05 to 0.1 weight percent of the treated glass fiber strands.

The treated glass fiber strands are added to water to form a dispersion and it is preferred that a dispersing agent such as Katapol VP532 dispersant in combination with the Natrasol HR 250 thickener be used in amounts in the range of about 0.001 to about 0.05 weight percent for each material based on the weight of the dispersion. The chopped glass fibers are added to the aqueous solution with the dispersing agents in a preferred amount of about 0.1 to 1.0 weight percent of the aqueous dispersion and, thereafter diluted with white water to about 0.01 to about 0.05 weight percent of the aqueous dispersion. The preferred polymeric material used to form the nonwoven, sheet-like mat is a urea formaldehyde resin modified to have anionic functionality, either by a blend of polymers or by the presence of anionic groups placed on the urea formaldehyde resin. The mat is dried and cured in an oven after any excess binder is removed by vacuum or suction means to produce the nonwoven, sheet-like mat of the present invention.

Additional information and further illustrations of the embodiments of the aqueous treating composition, treated glass fibers, dispersion and nonwoven, sheet-like mat of the present invention are presented in the following examples, although these examples do not limit the scope of the invention to these specific embodiments.

EXAMPLES

Four examples of the treating composition applied to glass fibers of the present invention, and one illustrative example of a treating composition applied to glass fibers are given in Table I. The commercially available material is available from PPG Industries, Inc. under the trade designation 2029. Table I presents data of the formulations of these examples. These formulations were prepared in and identical manner to that disclosed in the specification and the preferred embodiment section of the specification for the various chemical compounds present in Examples 1–4 and illustrative example 1.

For example, to prepare 100 gallons (378.5 liters) of the aqueous chemical treating composition of Example 4, the following formulation is used:

| | |
|---|---|
| Cold water | 30 gal (113.6 l) |
| Gamma-glycidoxypropyltrimethoxy silane (Z-6040 from Dow Corning Chemical Company | .54 lb (.24 Kg) |
| Cold water for silane | 5 gal (18.9 l) |
| Cation X lubricating surfactant | 1.4 lb (.62 Kg) |
| Warm water | 3 gal (11.3 l) |
| Cold water | 3 gal (11.3 l) |
| Poly(oxyethylene-oxypropylene) copolymer (Tetronic 1508) | 3.8 lb (1.7 Kg) |
| Hot water | 8 gal (30.3 l) |
| Cold water | 8 gal (30.3 l) |
| National 1554 low amylose starch (30% amylose) | 1 lb (0.44 Kg) |
| Amaizo 213 high amylose starch (50% amylose) | 0.18 lb (.08 Kg) |
| Fungicide (Biomet 66) | 25 ml |

The aqueous chemical treating composition is prepared by adding 5 gal of deionized water to a premix tank, where the water is metered to control the concentration of the starch. With agitation, the two starches are added to the premix tank. All lumps are removed before cooking. The starch slurry is heated to 100°±5° F. (37.7° C.±3° C.). The heated starch slurry is pumped along with dilution water to a jet cooker so the slurry is diluted before cooking, about 5±3%, and after cooking, about 30±5%. The starch slurry is cooked at about 255°±2° F. (124°±1° C.) at a sufficient rate to allow the starch to form a suspension.

The cooked starch is transferred to a main mix tank and the specified amount of cold water is added to the main mix tank. The main mix tank is cooled to 90° F.

(32° C.). The organo silane is added to its cold water in a premix tank with 30 minutes agitation. The material is transferred to the main mix tank.

The Cation® X lubricating surfactant is added to its warm water (130°±5° F.) (54° C.±3° C.) in a premix tank and agitated for 20 minutes. The cold water for Cation® X material is added and the mix is transferred to the main mix tank.

The Tetronic 1508 copolymer is added to hot water 180°±20° F. (82°±11° C.) and heated to 200° F. (93° C.) and held at 180°–200° F. (82°–93° C.) with agitation for 30 minutes or until solution is complete. The solution should be clear and also free of gel particles. The cold water for the copolymer is added to the hot solution, and the mixture is transferred to the main mix tank.

The fungicide is added and the main tank mixture is diluted to its final volume of 100 gal (378.5 l). The solids is 0.7±0.3 and the pH is 5.5±0.5. The specific gravity is 1.001.

TABLE I

| | Illustrative Ex. Wt % | Ex. 1 | Ex. 2 | Ex. 3 | Ex. 4 |
|---|---|---|---|---|---|
| Polyoxyalkylene (Pluracol® V-10) | 81 | — | — | — | — |
| Poly(oxyethylene-oxypropylene) Copolymer (Tetronic® 1508) Ratio M/wt 80/20  30,000 | — | 81 | 64.8 | 63.3 | 64.9 |
| Cationic lubricating surfactant (Cation-X) | 13 | 13 | 10.4 | 10.1 | 7.8 |
| Glycidoxy-propyltrimethoxy silane (A-187) | 6 | 6 | 6 | 7 | 7.2 |
| Starch NS-1554, Amaizo 213 85:15 ratio | — | — | 20 | 20 | 20 |
| Water - sufficient to give a total solids in weight percent of | 1 | 1 | 1 | 1 | 1 |

Figure 2:
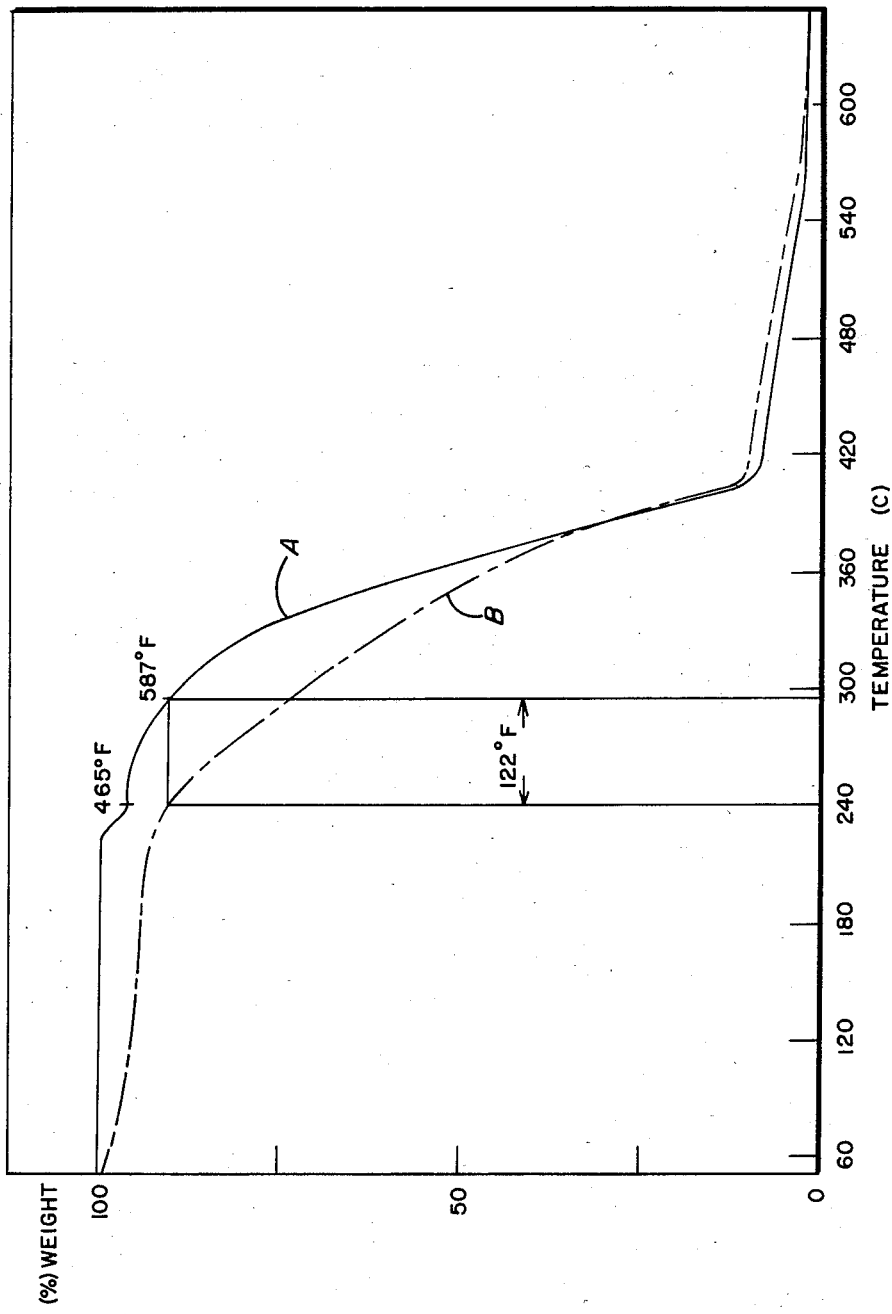
FIG. 2 presents thermal gravimetric analytical curves A and B for an example of the aqueous treatment present on the glass fibers of the present invention, Curve A, as compared to a treatment present on commercially available glass fibers, Curve B.

FIG. 2 presents a comparison of the thermagravimetric analysis of treating compositions of Example 1, as Curve A, versus the illustrative example, as Curve B. The analysis was performed on a Perkin Elmer machine, Model TGF-S-2 according to the machines established procedures for sample preparation and procedure to measure weight loss per time. The sample weights were 6.5821 mg and the scan rate was 20.00 degrees/minute. The curves show an improved thermal performance of Curve A over Curve B and of Example 1 over the illustrative example.

The treating compositions of Table I were used to treat glass fibers having a filament diameter of around 15.88±0.63 microns in a wet chop forming process. The individual glass fibers were gathered into one or more strands and chopped into legnths, where the average length of the chopped glass fiber strand was around 0.5 inch (12.7 mm). In obtaining the separately treated chopped glass fiber strand samples from the examples of the treating formulations of Table I, all of the glass fibers were treated in a similar manner with a belt-type applicator, where the glass fibers were attenuated at a similar speed and the belt-type applicator was driven at a similar speed. The amount of the treating composition present on the treated glass fibers was around 0.05 to about 0.5 percent on a loss on ignition (LOI) basis. These various samples of treated chopped glass fiber strands were used to make separate aqueous dispersions of glass fibers, which were then prepared into separate nonwoven, sheet-like glass mats that were impregnated with the same binder. These nonwoven, sheet-like mats were then tested for various physical properties. These properties tested included dry tensile, wet tensile, hot-wet tensile, hot-wet retention and tear strength.

The nonwoven, sheet-like mats of glass fibers for examples 1A, 2A, 3A, 4A and Ill. Ex. A of Table II were prepared by a hand sheet making procedure. The procedure involved using a sheet mold with a 55 gallon (208 liter) drum used for recirculating white water. An acrylic modified, anionic urea formaldehyde resin commercially available from Reichhold Chemical Company under the designation 21-134 was placed into a solution in a premix vessel. The sheet mold was flushed and cleaned as were the connecting lines and the 55 gallon drum with 27.5 gallons (104 liters) of city or a specified water. To this there was added an amount of thickener which was Natrasol 250 HR, and the mixture was stirred for around 2 minutes. A pH modifier was added to adjust the pH to around 8 to 8.5 with stirring. A wetting agent, preferably Katapol dispersing agent, was added and the mixture stirred for around 2 minutes. In a premix bucket, the slurried glass fiber solution was prepared by a Lightning mixer with an air pressure set about 10 psi (0.68 atmosphere). The Natrasol 250 HR thickener, ammonium hydroxide, and Katapol agent were added in a sequence similar to the preparation of the white water and the mixture was stirred for 10 minutes. An amount of 75 grams of glass fiber based on 0% moisture were added to make a 0.5 percent batch of slurried fibers and the mixture was stirred for 5 minutes at 20 psi (1.36 atmosphere). The nonwoven, sheet-like mats were prepared by filling the sheet mold from the screen with around 35 liters of white water using a sump pump, which is submerged in the 55 gallon drum recirculating tank. Any air bubbles that formed on the screen were removed with a plunger. Around 1450 to 1500 ml. of the 0.5 percent slurried fiber glass batch solution was added to the water in the sheet mold. On final dilution, this percentage was 0.02 percent. The water is agitated with a plunger in the sheet mold. After five seconds, the white water is drained back into the 55 gallon drum and the sheet mold is opened and the screen and glass mat are carefully removed together. The glass mat is dewatered carefully by slowly and evenly pulling the mat and screen away from the mold and over a vacuum slot having dimensions of 3/16 of an inch (4.76 mm) by 12 inches (304.8 mm), or whatever length. The anionic urea formaldehyde resin is applied to the glass mat with a paint sprayer by evenly spraying the saturated mat without causing any distortion in the mat format. The excess resin is removed from the mat by pulling the mat and screen evenly and smoothly away from the slot across the vacuum bar. The mat and screen are flipped over a piece of available fabric and screen is removed and the fabric and mat are placed in a forced air oven at a temperature of around 240° F. to around 270° F. (116° C. to 132° C.) for approximately five minutes. After drying is completed, the sheet is ready for curing and testing. This curing is accomplished by placing the glass mat in a forced air oven at a temperature around 390 to around 410° F. (199° to 210° C.) for around 2 minutes.

The nonwoven, sheet-like mat of glass fibers prepared from examples 3B, 4B and Illustrative Example B (Ill. Ex. B) were prepared in the same manner as the mat made of chopped glass fibers treated with the formulations of Table I. The only exception was that instead of the anionic urea formaldehyde resin being used, a cationic urea formaldehyde resin was used which is available from Reichhold Chemical Co. as 21-133 resin.

The tensile strenth of the nonwoven, sheet-like mat was measured under various conditions using a sample of the material, which was 1 inch (25.4 mm) by 7 inches (178 mm). The dry tensile of the sample was tested in an Instron testing machine with a jaw distance of 5 inches (127 mm), where the jaws were padded or taped sample ends were used. The crosshead speed used for the Instron machine was 0.2 inches (5.1 mm) per minute. In the dry tensile test, the sample was placed in the Instron and the breaking point was measured in pounds per inch. Another sample that was 1 inch by 7 inches (25.4 by 178 mm) was soaked in water for a period of 5 minutes and then tested in the Instron testing machine under the same conditions as the dry tensile test to obtain wet tensile strength data. Another sample that was 1 inch by 7 inches (25.4 by 178 mm) was treated in a hot water bath at a temperature of 180° F. (82° C.) for a period of time of 10 minutes. This treated sample was then tested in the Instron testing machine using a similar procedure as that for the dry and wet tensile to obtain hot-wet tensile data. The hot-wet retention was calculated as a percentage and was determined in the following manner.

$$\% \text{ Hot wet retention} = \frac{\text{Hot wet tensile}}{\text{Dry tensile}} \times 100\%$$

The tear strength of the sample was measured according to a standard test of the American Society of Testing Materials (ASTM), test procedure D689 with a revision using the Elmendorf tear tester. The revision allows the use of data on reinforced glass mats, where the tear may deviate from the initial slit in the sample instead of following a reinforcing strand.

The binder distribution in the nonwoven, sheet-like mat was tested according to a loss on ignition (LOI) test. The sample weight was 5 to 7 grams and the temperature of treatment was 600°±25° C. for a period of time of 15±1 minute. The procedure involved using three samples laid across a sheet which was subjected to the temperatures for the stated time. The LOI is recorded to the nearest 1/10 percent for each sample.

TABLE II

| | | Performance of Glass Fiber Papers | | | |
|---|---|---|---|---|---|
| Sample | Paper Binder | Dry Tensile (lbs) | % Hot-Wet Rentention | Tear (g) | Wet-Web Integrity |
| Ill. Ex | A | 35.7 | 50 | 411 | Poor |
| | B | 30.8 | 52 | 432 | — |
| Ex. 1 | A | 44.9 | 41 | 401 | Poor |
| Ex. 2 | A | 42.1 | 43 | 378 | Good |
| Ex. 3 | A | 42.4 | 47 | 381 | Good |
| | B | 33.0 | 51 | 410 | — |
| Ex. 4 | A | 52.5 | 61 | 376 | Excellent |
| | B | 36.3 | 62 | 421 | — |

Table II presents the data from these tests for the glass fibers treated with the aqueous treating compositions of the examples.

The data of Table II show the improved dry tensile and in most cases, the improved wet integrity with good properties of hot-wet retention, and tear for Examples 1-4 A and B over the illustrative examples A and B. The most important characteristic in preparing a sheet-like mat is the dry tensile. An improvement in this characteristic with comparable values in the other performance characteristics is considered an improvement in the glass paper industry. The dispersions of Examples 1 through 4 were comparable to that of the illustrative example in preparing the aqueous slush from which the mat is prepared. The better performance of Examples 2, 3, and 4 over the Illustrative Example and Example 1 in the wet-web integrity parameter shows the effect of the starch of the glass fibers. Both the Illustrative Example and Example 1 are devoid of starch. The treated glass fiber strands of Example 4 gave the best results for a majority of the strength parameters that were measured for the nonwoven, sheet-like mat over those of the illustrative examples.

The improved choppability of the glass fiber strands of the present invention was shown in a choppability performance test of strands from Example 4 versus strands from the Illustrative Example, both from Tables I and II. Strands of Example 4 gave approximately a 25% reduction in chopper cot and head usage in chopping strands into 1 inch (2.54 cm) lengths. Over a period of several days in producing and chopping strands of Example 4 and the Illustrative Example into 1 inch (2.54 cm) lengths, the 25 percent improvement is indicated:

| Sample | Days | Polyurethane cot changes/ 8 hr. period | Cutter head changes/ 8 hr period |
|---|---|---|---|
| Ills. Ex. | 6 | 15.9 | 19.4 |
| Ex. 4 | 10 | 11.6 | 13.4 |

The higher number of days with the lower values of cot and cutter head changes indicate the improved choppability.

The foregoing has described treated glass fibers having adequate protection when they are gathered into strands for processing of the strands. Also described are chopped treated glass fiber strands, which have good choppability and good dispersibility in aqueous media with or without dispersing aids. Another feature of the present aforedescribed invention is an aqueous dispersion of chopped glass fibers, where the dispersion has good uniformity which leads to good strength properties for nonwoven, sheet-like mat. An additional further feature of the present invention is the nonwoven, sheet-like mat with a binder that is useful as a substitute for felt in the production of shingles and also as a base or reinforcing material in roofing such as built-up roofing systems and also as a base or reinforcing material for flooring applications. The foregoing features of the invention result from the treating composition on the glass fiber where the solids are comprised of a cationic surfactant with one or more primary, secondary and/or tertiary amines and a poly(oxyethylene-oxyalkylene) copolymer lubricating and protecting material and an organo polar functional coupling agent, and optionally one or more starches.

I claim:

1. Glass fibers coated with an aqueous chemical treating composition, comprising:
   (a) one or more cationic surfactants having one or more primary, secondary, or tertiary amine moieties in an amount of about 0.01 to about 10 weight percent of said aqueous chemical treating composition,
   (b) one or more water soluble, poly(oxyalkylene-oxyethylene) copolymers having a ratio of the total amount of ethylene oxide to the total amount of hydrophobic alkylene oxide in the range of around 99/1 to around 78/22 and a molecular weight of around at least 15,000 in an effective amount to provide sufficient protection to the glass fibers, (c) one or more polar functional coupling agents in an amount of about 0.01 to about 2 weight percent of said aqueous chemical treating composition, and (d) water in an amount to give, a solids content that is effective for applying said composition to glass fibers.

2. Glass fibers of claim 1, wherein said cationic surfactant is selected from the group consisting of aliphatic mono-, di- and polyamines, 2-alkyl-imidazolines, 1-(2-aminoethyl)-2-alkyl-2-imidazoline, amine oxides, polyoxyalkylene alkylamines, 1-(2-hydroxyalkyl)-2-alkyl-2-imdaozline, 2-hydroxy-alkyl-2-imidazoline, N,N,N',N', tetrakis-substituted ethylene diamine derivatives, rosin derived amines, polyoxyethylene alicyclic amines; polyoxyethylenedihydroabietyl amines and reaction products of carboxylic or fatty acids with di or polyamines and dialkylene or polyalkylamines and polyalkoxylated derivatives thereof.

3. Glass fibers of claim 1, wherein said cationic surfactant is an alkyl imidazoline derivative of the class n-alkyl-N-amidoalkyl imidazolines formed by causing fatty acids or carboxylic acids to react with polyalkylene polyamines under conditions that produce ring closure.

4. Glass fibers of claim 1, wherein the amount of said cationic lubricating surfactant in said composition is not greater than 15 weight percent of the solids based on the amount of said copolymer.

5. Glass fibers of claim 1, wherein said copolymer has an average molecular weight in the range of about 24,000 to about 30,000.

6. Glass fibers of claim 1, wherein said copolymer has a hydrophobic alkylene oxide selected from the group consisting of propylene oxide, butylene oxide, styrene oxide and cyclohexane oxide.

7. Glass fibers of claim 1, wherein said copolymer has an oxide ratio of about 80/20 to about 90/10.

8. Glass fibers of claim 1, wherein the amounts of said copolymer is in the range of about 0.1 to about 15 weight percent of said aqueous chemical treating composition.

9. Glass fibers of claim 1, wherein said copolymer is a tetrafunctional block copolymer derived from the addition of ethylene oxide and propylene oxide to ethylenediamine and has the NMR spectra of FIG. 1.

10. Glass fibers of claim 1, wherein said polar functional coupling agent is selected from the group consisting of epoxy silane coupling agents, amino silane coupling agents, acrylic-containing silane coupling agents, thio-containing silane coupling agents, ureido-modified silane coupling agents, and organo chlorine silane coupling agents.

11. Glass fibers of claim 1 wherein the amount of said water has been reduced by drying.

12. Glass fibers of claim 1, wherein the amount of said treating composition on the glass fibers is in the range of about 0.01 to about 5 weight percent of the treated glass fibers.

13. Glass fibers of claim 1, wherein said composition further comprises up to 35 weight percent of the solids of the aqueous treating composition of one or more starches that are incompletely soluble or insoluble in cold water.

14. Glass fibers coated with an aqueous chemical treating composition, comprising:

(a) one or more cationic lubricating surfactants having one or more primary, secondary, or tertiary amine moieties in an amount of about 0.01 to about 10 weight percent of the aqueous chemical treating composition, (b) one or more water soluble, poly(oxyethylene-oxypropylene) tetrol copolymers having a ratio of total amount of ethylene oxide to the total amount of propylene oxide in the range of around 99/1 to around 78/22 in an effective amount to provide sufficient protection to the glass fiber, present in an amount of about 0.1 to about 15 weight percent of the aqueous composition, and where the amount of one or more cationic lubricants is less than about 15 weight percent on a solids basis of the copolymer, (c) one or more polar functional coupling agents in an amount of about 0.01 to about 2 weight percent of the aqueous chemical composition, (d) one or more starches that are water dispersible and less than 100 percent soluble in cold water in an amount in the range of up to about 35 weight percent of the solids of the aqueous chemical treating composition, and (e) water in an amount to give a solids content that is effective for application of said aqueous chemical treating composition to the glass fibers.

15. Glass fibers of claim 14, wherein said copolymer has an average molecular weight in the range of about 24,000 to about 30,000.

16. Glass fibers of claim 14, wherein the amount of said one or more starches is in the range of from about 15 to about 25 weight percent of said treating composition.

17. Glass fibers of claim 16, wherein said one or more starches is a blend of a high and low amylose-containing starches.

18. Glass fibers of claim 17, wherein said blend is an 85:15 blend of a high amylose starch to a low amylose starch.

19. Glass fibers of claim 14, wherein the total of said solids is in the range of about 0.1 to about 7.5.

* * * * *